W. S. S. FLEMING.
LAWN TRIMMING IMPLEMENT.
APPLICATION FILED SEPT. 27, 1909.
971,000.
Patented Sept. 20, 1910.
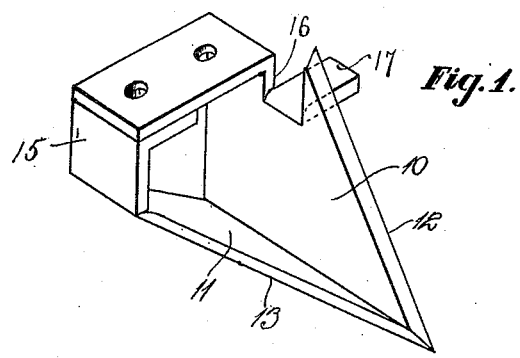
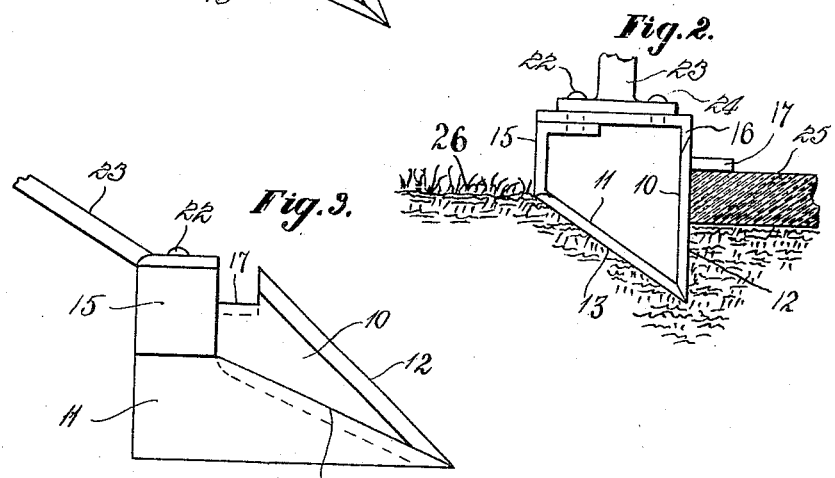
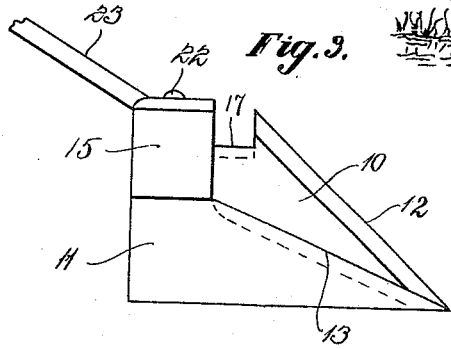
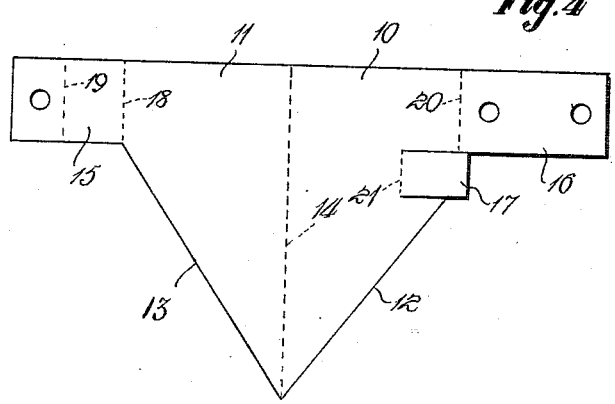
Witnesses
C. C. Chandlee
C. N. Woodward
Inventor
William S. S. Fleming
By Chandlee & Chandlee
Attorney

UNITED STATES PATENT OFFICE.

WILLIAM S. S. FLEMING, OF PORTLAND, OREGON.

LAWN-TRIMMING IMPLEMENT.

971,000. Specification of Letters Patent. Patented Sept. 20, 1910.

Application filed September 27, 1909. Serial No. 519,714.

*To all whom it may concern:*

Be it known that I, WILLIAM S. S. FLEMING, a citizen of the United States, residing at Portland, in the county of Multnomah, State of Oregon, have invented certain new and useful Improvements in Lawn-Trimming Implements; and I do hereby declare the following to be a full, clear, and exact description of the invention, such as will enable others skilled in the art to which it appertains to make and use the same.

This invention relates to lawn trimming implements, more particularly to implements of this class designed to cut the groove between the lawn and the walks, and has for its object to simplify and improve the construction and increase the efficiency and utility of devices of this character.

With this and other objects in view, the invention consists in certain novel features of construction as hereafter shown and described and then specifically pointed out in the claim, and in the drawings illustrative of the preferred embodiment of the invention, Figure 1 is a perspective view of the improved implement. Fig. 2 is a front elevation of the same. Fig. 3 is a side elevation of the improved implement. Fig. 4 is a view of the blank from which the implement is constructed.

The body or stock of the improved implement is constructed from a single plate of metal cut into the shape shown in Fig. 4 and comprises two main portions 10—11 with oblique edges 12—13 and bent centrally along the line 14 into V-shape transversely. The portion 11 is provided with a projection 15, while the portion 10 is provided with a similar, but longer projection 16. The portion 10 is also provided with a projection 17 between the oblique portion 12 and the projection 16. The inner portion of the extension 15 is bent along the line 18, at an angle to the portion 11, while the outer portion of the portion 15 is bent along the line 19 at right angles thereto, while the portion 16 is bent along the line 20 at right angles to the portion 10 and inwardly toward the portion 15. The tongue portion 17 is also bent at right angles to the portion 10 along the line 21, but reversely to the portion 16, or outwardly from the portion 10. The portions 10—15 when the device is in operative position will be vertical, as shown in Figs. 1 and 2, while the portion 16 which is located in advance of the bend 20 will be horizontal and will be secured by rivets or other similar fastening devices 22 to the outer right angled portion of the extension 15. The horizontal portion of the extension 16 forms a base to receive the handle 23, which is secured in position by rivets or other suitable fastening means 24. The oblique portions 12—13 are ground to a knife-edge as shown.

With a device thus constructed a groove or channel may be readily cut in the lawn along the edge of the walk by simply forcing the implement forwardly with the vertical portion 10 against the edge of the walk and the gage member 17 bearing upon the upper surface of the walk, as illustrated in Fig. 2, wherein a portion of the walk is indicated at 25 and the ground or sod at 26. By this arrangement it will be obvious that the depth of cut may be readily controlled by simply depressing or elevating the handle, the gage 17 thus serving as a fulcrum to control the depth of the cut. The gage member 17 being located between the "point" of the implement and the handle, the point may be elevated or depressed to increase or decrease the depth of the cut. By this simple means the depth of the cut is under the control of the operator without exercising any material pressure or strain either upon the implement or upon the operator.

The improved implement is simple in construction, will be constructed preferably of steel and suitably tempered and may be inexpensively manufactured, and of any required size.

The improved implement may be employed for trimming lawns alongside of paths which are not provided with cement or other walks by using care in guiding the implement.

What is claimed is:—

A lawn trimming implement formed from a single sheet of metal comprising a forwardly extending V-shaped cutting portion with vertically extending side portions at the rear and with a horizontal portion uniting the vertical portions, a laterally extending gage member between the cutting portion and one of said vertical portions, and a handle connected to said horizontal portion.

In testimony whereof, I affix my signature, in presence of two witnesses.

WILLIAM S. S. FLEMING.

Witnesses:
C. F. PFLUGER,
A. T. LOEWIG.